United States Patent
Tsutsui et al.

(10) Patent No.: US 7,276,869 B2
(45) Date of Patent: Oct. 2, 2007

(54) MOTOR CONTROLLER AND MOTOR CONTROLLING METHOD

(75) Inventors: Kazuhiko Tsutsui, Tokyo (JP); Jyun Sawaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/572,676

(22) PCT Filed: Jun. 11, 2004

(86) PCT No.: PCT/JP2004/008566

§ 371 (c)(1),
(2), (4) Date: Mar. 20, 2006

(87) PCT Pub. No.: WO2005/122385

PCT Pub. Date: Dec. 22, 2005

(65) Prior Publication Data

US 2006/0279241 A1    Dec. 14, 2006

(51) Int. Cl.
*H02K 17/32* (2006.01)

(52) U.S. Cl. .................. 318/434; 318/727; 318/432

(58) Field of Classification Search ............. 318/434, 318/432, 433, 727, 567, 560; 388/800, 823
See application file for complete search history.

(56) References Cited

U.S. PATENT DOCUMENTS

2002/0057069 A1* 5/2002 Kushida ............... 318/727

FOREIGN PATENT DOCUMENTS

| JP | 3-82385 A | 4/1991 |
| JP | 2001-62678 A | 3/2001 |
| WO | WO 02/39574 A1 | 5/2002 |
| WO | WO 03/085816 A1 | 10/2003 |

* cited by examiner

*Primary Examiner*—Karen Masih
(74) *Attorney, Agent, or Firm*—Sughrue Mion, PLLC

(57) ABSTRACT

In a case where a motor cannot follow up a position designated by a position instruction in a velocity operation mode, when an operation is performed in a constant power operating region, or when a voltage is saturated, a limit is put on a position deviation in a motor control apparatus. A correction position deviation amount, by which the motor cannot follow up the position instruction, is subtracted from the position deviation. Further, a motor position-within-one-revolution deviation in the subtracted correction position deviation amount is corrected in a region in which the characteristic of torque is improved. Consequently, the followingness of the motor to the motor position-within-one-revolution in the position designated by the position instruction is ensured.

11 Claims, 16 Drawing Sheets

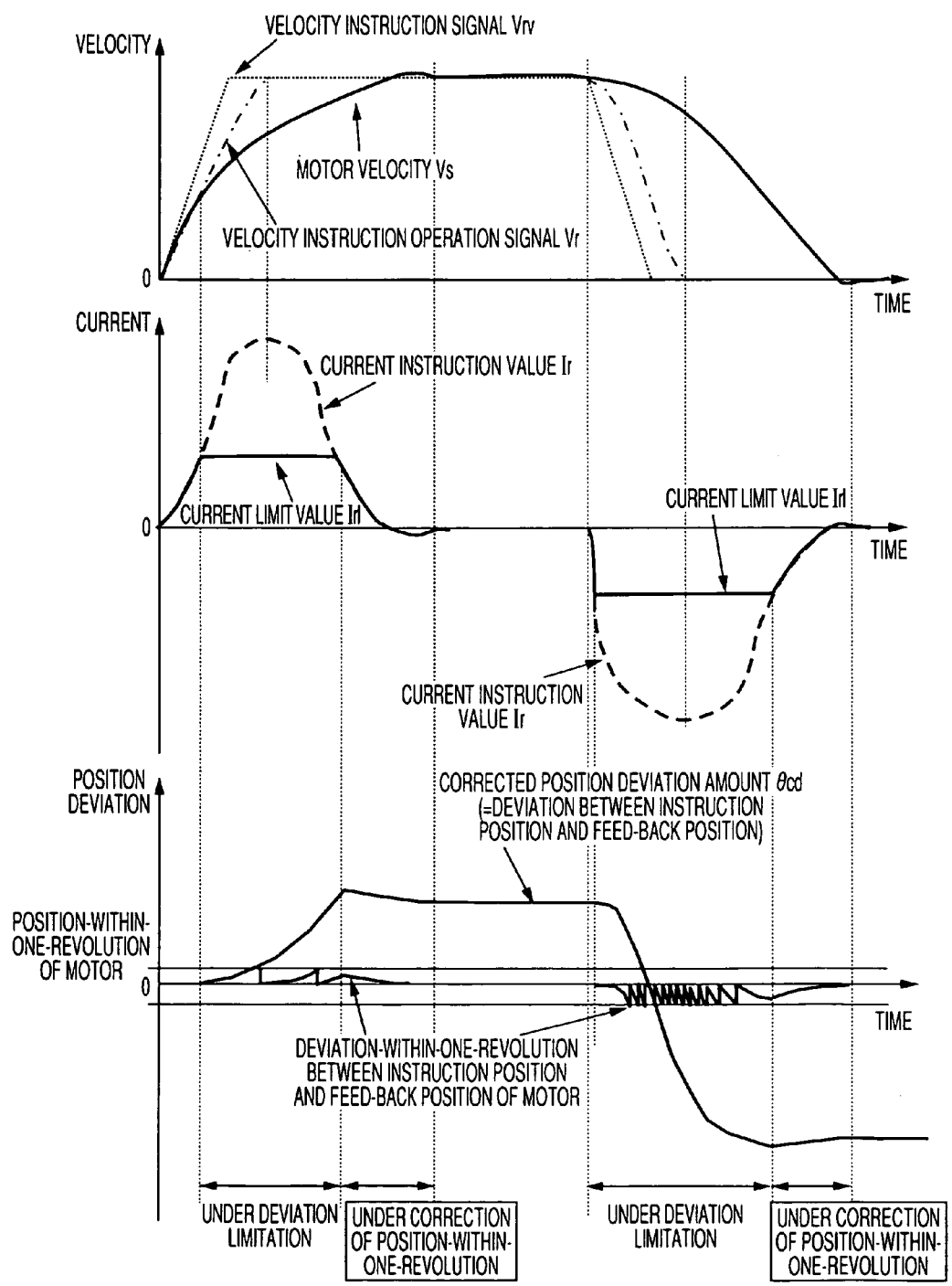

MOTOR CONTROLLER AND MOTOR CONTROLLING METHOD

BACKGROUND OF THE INVENTION

1. Field of the Invention

The present invention relates to a motor control apparatus and control method applied to a spindle motor or the like, which drives a machine tool.

2. Description of the Related Art

FIG. 14 shows a control block diagram of a conventional motor control apparatus having a switch unit adapted to switch between a position loop and a velocity loop according control modes to deal with a position control operation and a velocity control operation. Referring to FIG. 14, a velocity instruction means 2 in an instruction generating means 1 generates a velocity instruction signal $V_{rf}$, while a position instruction means 3 in the instruction generating means 1 generates a position instruction signal $\theta_r$.

A switching means 4 is adapted to switch between a position control operation and a velocity control operation. A switching control means 4a is adapted to control switches 4b and 4c to thereby switch between a position control loop and a speed control loop. When a position control operation is requested, a position deviation signal $\theta_e$ representing the difference between a position instruction signal $\theta_r$ having passed through the switch 4b, which is in a connected state, and a position signal $\theta_s$, which is detected by a position detecting means 6 and represents the position of a motor 13, is inputted to a position control means 5. The position control means 5 outputs a velocity instruction operation signal $V_r$ obtained by converting the inputted signal into a velocity instruction. Incidentally, when a position control operation is requested, or when spindle orientation is performed, a position instruction signal $\theta_r$ is outputted from the instruction generating means 1. However, when a velocity control operation is requested, the switch 4b is in a connected state. Further, the switch 4c is connected to an upper contact, as viewed in the figure. Thus, a velocity instruction signal $V_{rv}$ outputted from a velocity instruction means 2 passes through the switch 4c.

A velocity deviation signal $V_e$ representing the difference between a value represented by the velocity instruction signal $V_{rv}$ having passed through the switch 4c and a derivative value, which is obtained by a differentiating means 7 from the position signal $\theta_s$ that is detected by the position detecting means 6 and represents the position of a motor 13, is inputted to a velocity control means 8.

A velocity control means 8 has a velocity proportional control means 9 and a velocity integral control means 10. When a velocity deviation signal $V_e$ is inputted to the velocity control means 8, the velocity deviation signal $V_e$ is transmitted to both the velocity proportional control means 9 and the velocity integral control means 10, which respectively calculate electric current instruction values. Then, the velocity control means 8 outputs a current instruction value $I_r$, which is obtained by adding up the calculated electric current instruction values, to a current limiting means 11. The current limiting means 11 limits the current instruction value $I_r$ to a maximum current value that can be outputted by a current control means 12. When a current is limited by this current limiting means 11, the current limiting means 11 instructs the velocity integral control means 10 to stop integration. The velocity integral control means 10 is configured to stop integration to thereby suppress, when electric-current limitation is canceled, occurrence of an overshoot with respect to the velocity instruction value due to unnecessary integration of the velocity deviation signal $V_e$ generated during the electric current is limited. Thus, the current control means 12 controls electric current of the motor 13 according to the current limit value $I_{r1}$ outputted from the current limiting means 11.

Further, FIG. 15 illustrates a technique (PCT WO03/085816A1) invented to solve the problem of the control apparatus shown in FIG. 14. In a control apparatus shown in FIG. 15, a switching means 4 of an instruction generating means 1 selects one of a position control operation and a velocity control operation according to an operation mode without performing an operation of switching between the position control loop and the velocity control loop as shown in FIG. 14. A velocity instruction signal $V_{rv}$ generated by a velocity instruction means 2 is converted by an integrating means 14 into a position instruction signal $\theta_r$ corresponding to the velocity instruction signal $V_{rv}$. Further, a model position generating means 15 calculates an ideal position of the motor 13 from an equivalent position control system model, which includes a characteristic of an object to be controlled, according to the position instruction signal $\theta_r$. When the current limiting means 11 limits the electric current to a maximum current, a position correction means 19 instructs correction of a position instruction in the motor control apparatus and operates according to the deviation between the position of the motor 13, which is calculated and outputted from the model position generating means 15, and that of the motor 13, which is actually measured by a position detecting means 6.

In the conventional motor control apparatus shown in FIG. 14, when the velocity control operation is requested, the position loop is separated therefrom, so that the motor is controlled by the velocity loop. In cases where the orientation is performed to position when the spindle is stopped, where synchronous tapping is performed, where an operation of the spindle is performed in synchronization with another spindle, and where cutting is performed under position control, the position loop is connected thereto thereby to perform a position control operation of the motor. This motor control apparatus performs the switching every operation mode. Thus, it is necessary for smoothly switching between the velocity loop and the position loop to once reduce the velocity of the motor to a certain velocity. First, the switch 4b shown in FIG. 14 is connected. An operation of the motor is continued at a constant velocity until a velocity instruction operation signal $V_r$ outputted by the position control means 5 is matched with a velocity instruction signal $V_{rv}$ outputted from the velocity instruction means 2 in the instruction generating means 1. When a match therebetween occurs, it is necessary to connect the switch 4c. Thus, a switching operation requires time. Switching timing is complicated. Further, at the orientation, the velocity of the motor is once reduced to a certain velocity. Thereafter, a position instruction designating positions from a position-within-one-revolution of the motor at that time to a stopping position in the instruction generating means 1 is generated. The current of the motor is reduced by the current control means 11 with a damping time constant with which the current does not reach the current limit value. Thus, the positioning is performed. Therefore, at the orientation, time required to reduce the velocity is long, as compared with a deceleration time needed when an ordinary velocity control operation is performed.

Further, on the condition that the velocity loop control mode may be unused, and that only the position loop control mode may be used in all operations, it is necessary to use the apparatus by reducing an acceleration or deceleration gradient within a range, in which torque is unsaturated, so as not to increase the position deviation due to the torque saturation caused by the current limitation, as not to cause an overshoot with respect to a target velocity, and as not to delay a deceleration start with respect to a deceleration instruction. Consequently, this conventional motor control apparatus has a problem in that an acceleration or deceleration time is long.

Further, the control apparatus (PCT WO03/085816A1) shown in a block diagram of FIG. 15 has been invented to solve the problem of the conventional motor control apparatus. When the current limiting means 11 limits the current of the motor to the maximum current due to saturation of a motor output voltage and to shortage of torque corresponding to an instructed acceleration at acceleration or deceleration of the motor, the position correction means 19 instructs correction of the position instruction in the motor control apparatus and operates according to the deviation between the position of the motor 13, which is calculated and outputted by the model position generating means 15, and that of the motor 13, which is actually measured by the position detecting means 6. Thus, current limitation is canceled. In response to a subsequent position instruction, the position of the motor is corrected to a desired position when conditions for satisfactorily following the subsequent position instruction are met.

Practically, a position correction amount control means 19a in the position correction means 19 puts a switch 19b into a connected state according to a current limiting instruction I1 transmitted from the current limiting means 11. Thus, a signal representing a virtual position deviation $\theta_d$ between the position of the motor 13, which is calculated by the model position generating means 15, and that of the motor 13, which is actually measured by the position detecting means 6, passes through the switch 19b by way of a differentiating means 17 and is outputted through as an integrating means 20 as representing a correction position deviation amount $\theta_{cd}$. Thus, in a case where the position instruction means 3 is selected by a switch 4d, correction is performed by substantially subtracting the virtual position deviation $\theta_{cd}$ from the position instruction signal $\theta_r$. Consequently, the conventional motor control apparatus has advantages in that a follow delay from the position instruction signal $\theta_r$ in the instruction generating means 1 is apparently eliminated, and that occurrence of an overshoot is suppressed when the current limitation is canceled.

FIG. 16 includes charts illustrating changes in velocity, electric current, and position deviation in the motor control apparatus shown in FIG. 15. In a case where the velocity instruction means 2 is selected by the switch 4d, the velocity command operation signal $V_r$ outputted from the position control means 5 is equivalent to the velocity instruction signal $V_{rv}$ due to an excessively large value represented by the position instruction signal $\theta_r$, which is obtained by being converted from the velocity instruction signal $V_{rv}$, even when the correction is conducted by subtracting the virtual position deviation $\theta_{cd}$ during current limitation is performed. Consequently, a difference from an actual velocity $V_s$ of the motor is increased. Therefore, a large deviation is present between an electric current instruction value $I_r$ and an electric current limitation value $I_{r1}$ before the current limitation is performed. Thus, in a case where an output torque characteristic of the motor is recovered, time taken to reduce the current instruction value $I_r$ to the current limitation value $I_{r1}$ is long. Therefore, this conventional motor control apparatus has a problem in that velocity control and position control, which are performed since a moment in the vicinity of a time at which the current limitation is canceled, are delayed.

SUMMARY OF THE INVENTION

This invention is accomplished to solve the aforementioned problems. According to the invention, there is provided a motor control apparatus adapted to control a motor by using a position loop and a velocity loop according to a position signal, which represents information on a rotational position of the motor driving an object to be controlled, and according to a position deviation signal, which represents a difference between the position signal and a position instruction signal designating a rotational position of the motor. The motor control apparatus features that this motor control apparatus includes a current limiting means adapted to limit an output current to the motor and also adapted to output, when the output current is limited, a current limiting signal, a deviation limiting means adapted to obtain, when the current limiting signal is outputted and when a velocity control operation is performed, an input/output deviation of the position deviation signal and also adapted to output a signal representing the obtained the input/output deviation, and an integrating means adapted to integrate this input/output deviation. This motor control apparatus also features that when each of a velocity instruction signal and an acceleration/deceleration instruction signal is detected from the position instruction signal, an integral value of the input/output deviation signal is subtracted from the position deviation signal.

Such a motor control apparatus can solve the problem that velocity control and position control, which are performed since a moment when the current limitation is canceled, are delayed. Consequently, overshoots related to the velocity and the position can be suppressed.

BRIEF DESCRIPTION OF DRAWINGS

FIG. 16 is a signal waveform diagram illustrating an operation of the conventional motor control apparatus.

DETAILED DESCRIPTION OF THE INVENTION

FIRST EMBODIMENT

Figure 1:
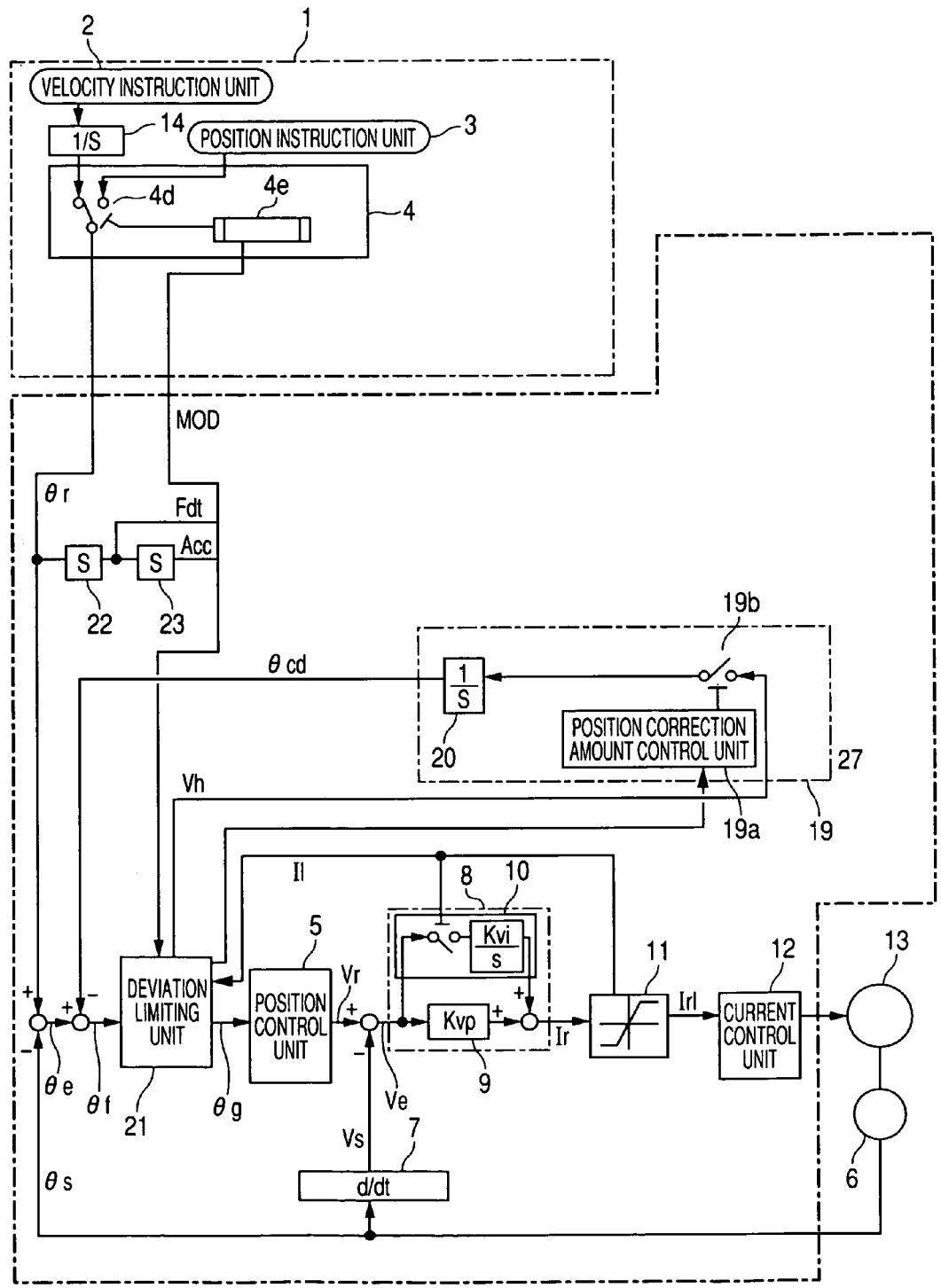
FIG. 1 is a block diagram of a motor control apparatus, which illustrates a first embodiment of the invention.
Figure 15:
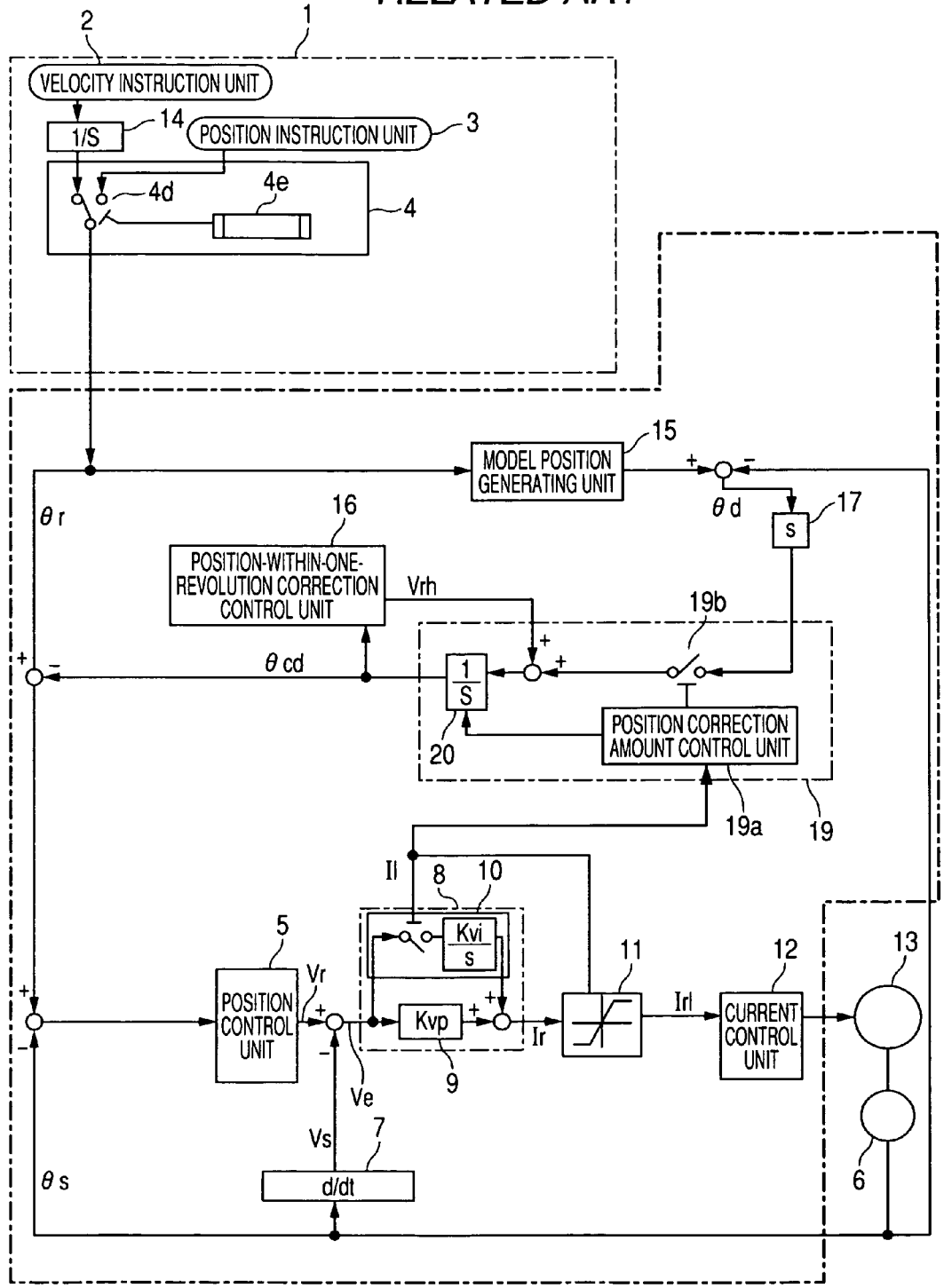
FIG. 15 is a block diagram illustrating a control apparatus (PCT WO03/085816A1) invented to solve a problem of the conventional motor control apparatus.

An embodiment of the invention is described by referring to FIG. 1. FIG. 1 is a block diagram of a motor control apparatus according to a first embodiment of this invention. Incidentally, in FIGS. 1 and 15, same reference characters designate same or corresponding parts. A velocity instruction means 2 in an instruction generating means 1 generates a velocity instruction signal $V_{rv}$, while a position instruction means 3 in the instruction generating means 1 generates a position instruction signal $\theta_r$. The velocity instruction signal $V_{rv}$ generated by the velocity instruction means 2 is converted by an integrating means 14 into a position instruction signal $\theta_r$ corresponding to the velocity instruction signal $V_{rv}$. A switching means 4 in the instruction generating means 1 is adapted to switch between a position control operation and a velocity control operation. A switching control means 4e changes over a switch 4d to thereby select the position control operation or the velocity control operation. At that time, the switching control means 4e outputs a position/velocity operation switching command MOD, which represents information designating the position control operation or the velocity control operation to be selected at the changeover.

A correction position deviation amount signal $\theta_{cd}$ generated by an integrating means 20 is subtracted from a position deviation signal $\theta_e$ representing the difference between the position instruction signal $\theta_r$ outputted from the instruction generating means 1 and a position signal $\theta_s$ detected by a position detecting means 6. Then, a resultant signal is inputted to a deviation limiting means 21 as a deviation input signal $\theta_f$. Further, the position instruction signal $\theta_r$ is converted by a differentiating means 22 into an instruction velocity signal $F_{dt}$. Also, a resultant signal is converted by a differentiating means 23 into an instruction acceleration signal $A_{cc}$. Then, the instruction acceleration signal $A_{cc}$ is inputted to a deviation limiting means 21 together with the position/velocity operation switching command MOD, the instruction velocity signal $F_{dt}$, the instruction acceleration signal $A_{cc}$, and a deviation input signal $\theta_f$. The deviation limiting means 21 performs predetermined processing and outputs a deviation limiting means output value $\theta_g$ to a position control means 5. The details of the deviation limiting means 21 are described later.

The deviation limiting means output value $\theta_g$ is inputted from the deviation limiting means 21 to the position control means 5. The position control means 5 outputs a velocity instruction operation signal $V_r$ having been converted to a velocity instruction. Further, a velocity deviation signal $V_e$ representing the difference between the velocity instruction operation signal $V_r$ and a derivative value of a position signal $\theta_s$ detected by a position detecting means 6, which value is obtained by a differentiating means 7, is inputted to a velocity control means 8.

The velocity control means 8 has a velocity proportional control means 9 and a velocity integral control means 10. When a velocity deviation signal $V_e$ is inputted to the velocity control means 8, the velocity deviation signal $V_e$ is transmitted to both the velocity proportional control means 9 and the velocity integral control means 10, which respectively calculate a proportional current instruction value and an integral current instruction value. Then, the velocity control means 8 outputs a current instruction value $I_r$, which is obtained by adding up the calculated current instruction values, to a current limiting means 11. The current limiting means 11 limits the current instruction value to a maximum current value that can be outputted by a current control means 12. Further, the current control means 12 controls electric current of the motor 13 according to the current limit value $I_{r1}$ outputted from the current control means 11.

When a current is limited by this current limiting means 11, the current limiting means 11 outputs a current limiting instruction I1 that causes the velocity integral control means 10 to stop integration. The velocity integral control means 10 is configured to stop integration to thereby suppress, when electric-current limitation is canceled, occurrence of an overshoot with respect to the velocity instruction value due to unnecessary integration of the velocity deviation signal $V_e$ generated during the electric current is limited. Further, the current limiting means 11 also outputs the current limiting instruction I1 to the deviation limiting means 21.

The deviation limiting means 21 is described below. The deviation limiting means 21 sends an instruction to a position correction amount control means 19a of a position correction means 19 according to information representing the position/velocity operation switching command MOD, the instruction velocity signal $F_{dt}$, the instruction acceleration signal $A_{cc}$ on the conditions imposed by the following process. The deviation limiting means 21 turns on the switch 19b, outputs an input/output deviation signal $V_h$, and also outputs a deviation limiting means output value $\theta_g$ to the position control means 5 according to predetermined conditions.

Figure 2:
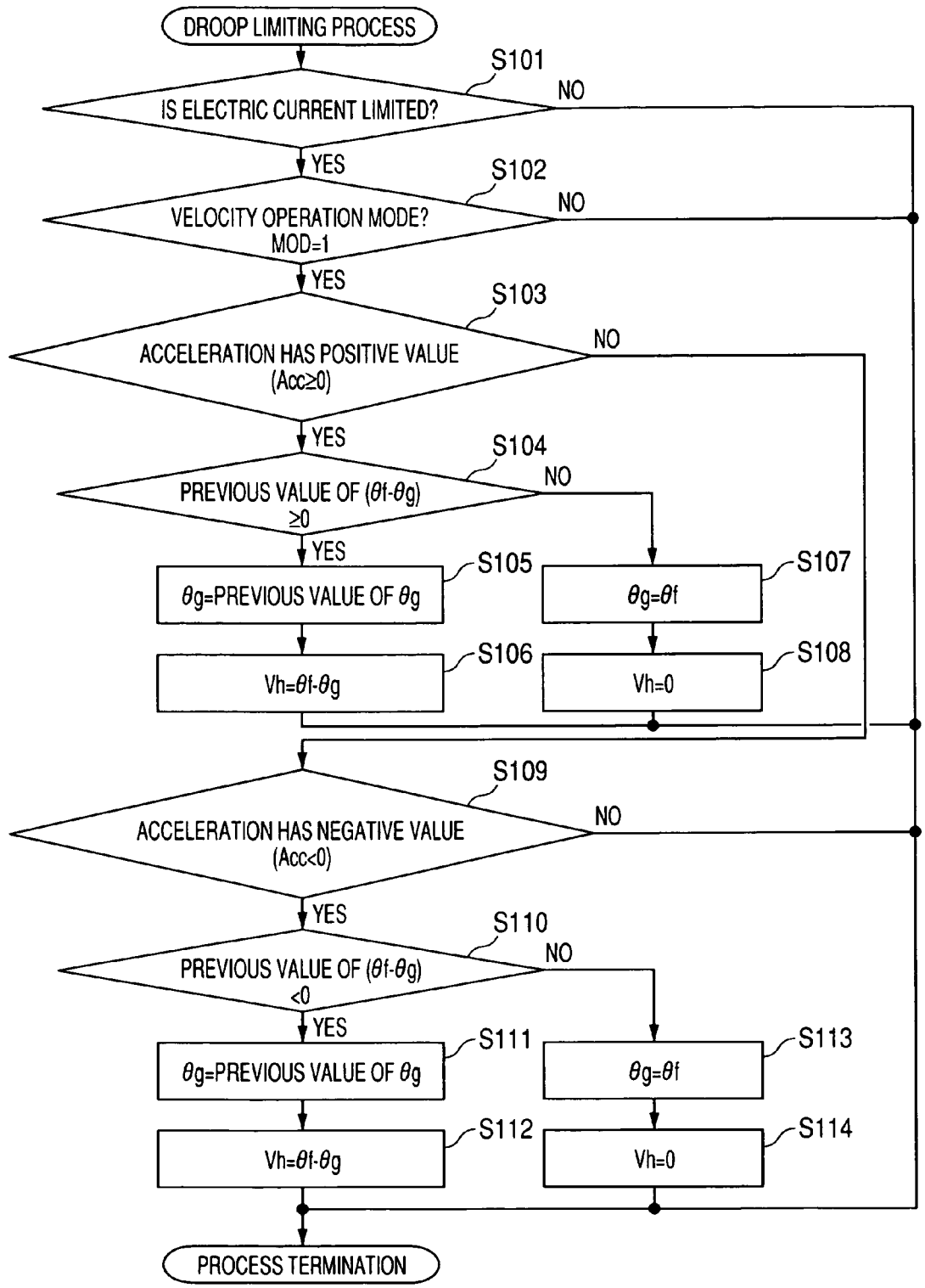
FIG. 2 is a flowchart illustrating a process performed by a deviation limitation means in the first embodiment of the invention.

FIG. 2 is a flowchart illustrating the process performed by the deviation limiting means 21 according to the first embodiment of this invention. The deviation limiting means 21 performs the following process and outputs a deviation limiting means output value $\theta_g$ to the position control means 5.

According to the process performed by the deviation limiting means 21, during the electric current limiting instruction I1 is performed (in step S101), in a velocity operation mode in which the position/velocity operation switching command (MOD) does not request absolute position followingness (in step S102), in a case where the instruction acceleration signal $A_{cc}$ has a positive value ($A_{cc} \geq 0$) (in step S103), when the deviation input signal $\theta_f$ increases in a positive direction (in step S104), the deviation limiting means output value $\theta_g$ is set at the last value of $\theta_g$ (in step S105), and an input/output deviation signal $V_h$ is set so that $V_h = \theta_f - \theta_g$ (in step S106). At that time, the deviation limiting means 21 sends an instruction to the position correction amount control means 19a in the position correction means 19 shown in FIG. 1 to turn on the switch 19b. Thus, the input/output deviation signal $V_h$ of the deviation limiting means 21 is accumulated in the integrating means 20 that outputs a correction position deviation amount signal $\theta_{cd}$. This correction position deviation amount $\theta_{cd}$ is subtracted from the position deviation signal $\theta_e$ to thereby generate a deviation input signal $\theta_f$.

Further, in a case where the instruction acceleration signal $A_{cc}$ has a negative value ($A_{cc}<0$) (in step S109), when the deviation input signal $\theta_f$ increases in a negative direction (in step S110), the output value $\theta_g$ is set at the last value of $\theta_g$ (in step S111), and the input/output deviation signal $V_h$ is set so that $V_h=\theta_f-\theta_g$ (in step S112).

When the input/output deviation signal $V_h$ from the deviation limiting means 21 is set so that $V_h=\theta_f-\theta_g$, the position correction amount control means 19a of the position correction means 19 shown in FIG. 1 turns on the switch 19b. Then, the input/output deviation signal $V_h$ from the deviation limiting means 21 is accumulated in the integrating means 20 to generate a correction position deviation amount signal $\theta_{cd}$. This correction position deviation amount signal $\theta_{cd}$ is subtracted from the position deviation signal $\theta_e$. Consequently, in a case where the current instruction value reaches a limit value in the motor control apparatus due to saturation of a motor output voltage and to insufficient torque for an instruction acceleration at acceleration or deceleration of the motor, when the velocity instruction means 2 is selected by the switch 4d, and even when the value of the position instruction signal $\theta_r$ converted from the velocity instruction signal $V_{rv}$ is too large, the input/output deviation signal $V_h$ serving as a basis of the correction position deviation amount $\theta_{cd}$ and also representing a difference between the position deviation signal $\theta_e$, which represents a difference between the position instruction signal $\theta_r$ and the position signal $\theta_s$ designating the position of the motor 13, and the correction position deviation amount signal $\theta_{cd}$, is appropriate as a signal designating a correction value, as compared with a signal obtained by integration of a signal based on the virtual position deviation $\theta_d$ indicating a difference between the position outputted from the model position generating means and the position signal $\theta_s$ designating the position of the motor 13 in the case described in the prior art document (PCT WO03/086816A1), because the velocity instruction signal $V_{rv}$ more reflects the position instruction signal $\theta_r$. Therefore, the present embodiment has an advantage in that the difference between a value represented by the velocity instruction operation signal $V_r$, which is outputted from the position control means 5, and the actual motor velocity $V_s$, can be suppressed from becoming too large. Consequently, the current instruction value $I_r$, which is thereafter obtained by the conversion, can be prevented from largely differing from the current limit value $I_{r1}$. Thus, the difference between the value represented by the velocity instruction operation signal $V_r$ and the actual motor velocity $V_s$ is difficult to increase. In a case where an output torque characteristic of the motor is recovered, time taken to reduce the current instruction value $I_r$ to the current limitation value $I_{r1}$ is not long. Therefore, the present embodiment can solve the problem that velocity control and position control, which are performed since a moment in the vicinity of a time at which the current limitation is canceled, are delayed.

Additionally, to prevent the output $\theta_g$ of the deviation limiting means 21 from increasing or decreasing, the difference between the velocity, which is represented by the velocity instruction operation signal $V_r$ outputted from the position control means 5 according to the output $\theta_g$, and the actual motor velocity $V_s$ can be prevented from increasing. Thus, the present embodiment has an advantage in that a value represented by the velocity deviation signal $V_e$ can be decreased by increasing or decreasing the actual motor velocity. Consequently, the current instruction value $I_r$, which is thereafter obtained by the conversion, can be made to little differ from the current limit value $I_{r1}$. Thus, the difference between the value represented by the velocity instruction operation signal $V_r$ and the actual motor velocity $V_s$ does not increase. In a case where an output torque characteristic of the motor is recovered, time taken to reduce the current instruction value $I_r$ to the current limitation value $I_{r1}$ is not long. Therefore, the present embodiment can more effectively solve the problem that velocity control and position control, which are performed since a moment in the vicinity of a time at which the current limitation is canceled, are delayed.

Incidentally, in the other cases in the processing performed in the deviation limiting means 21, the deviation limiting means output value $\theta_g$ is set to be a value represented by the deviation input signal $\theta_f$. Further, the correction position deviation amount $\theta_{cd}$ is not outputted, because a value represented by the input/output deviation signal $V_h$ is set to be 0 and the switch 19b is turned off.

Figure 3:
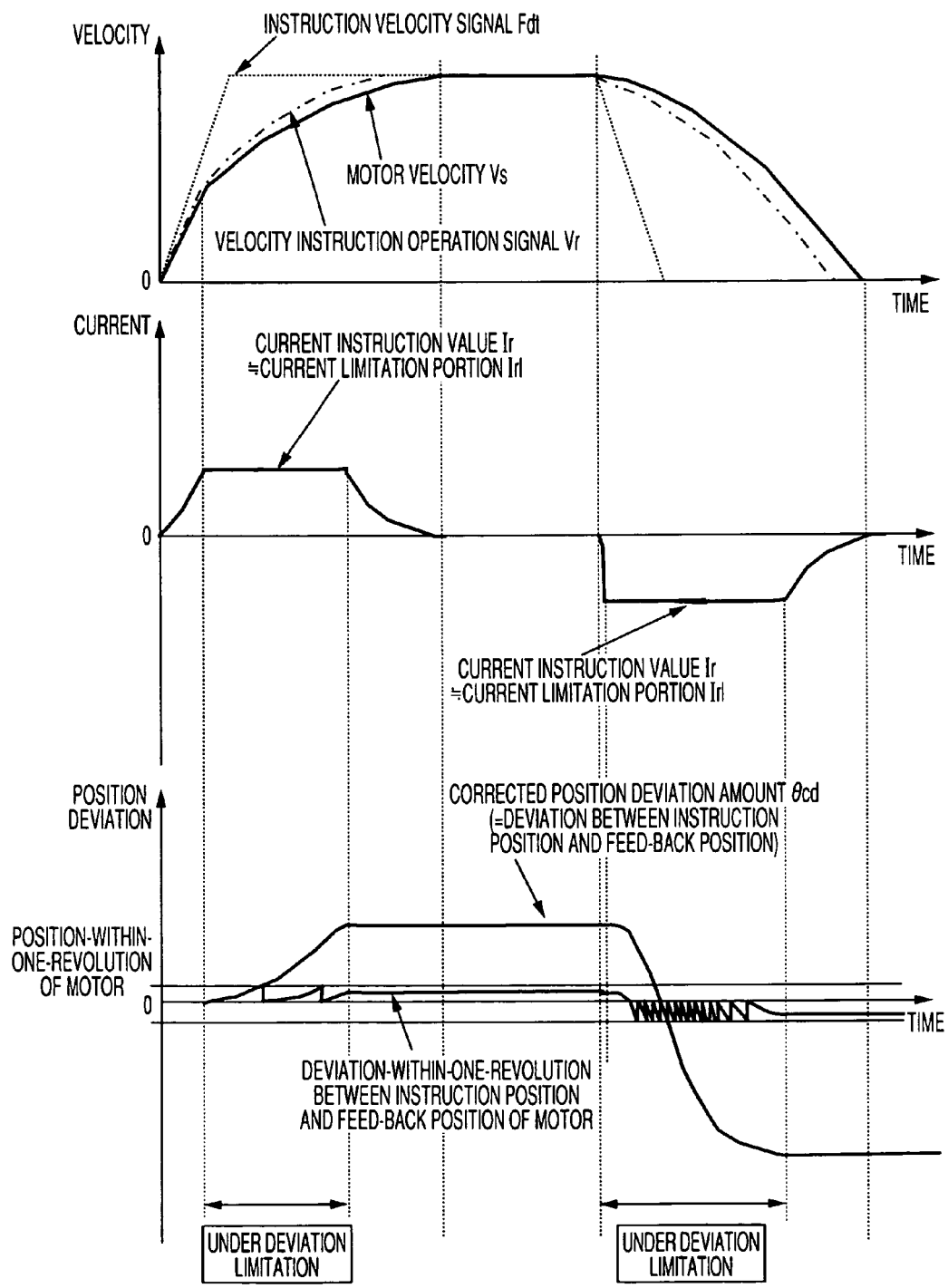
FIG. 3 is a signal waveform diagram illustrating an operation of the first embodiment of the invention.

Furthermore, FIG. 3 is a signal waveform diagram illustrating an operation of the implemented first embodiment of the invention. In a chart shown at a top part of FIG. 3, the abscissas represent time, while the ordinates represent the velocity. A chain line represents a velocity instruction signal $F_{dt}$. A dot-and-dash line represents a velocity instruction operation signal $V_r$. A solid line represents a motor velocity $V_s$. In a chart at a middle part of FIG. 3, the abscissas represent time, while the ordinates represent the electric current. A solid line represents the current instruction value. In a chart shown at a bottom part of FIG. 3, the abscissas represent time, while the ordinates represent the position deviation. Solid lines represent the correction position deviation amount $\theta_{cd}$ and the deviation within one revolution of the motor. Even in a case where sufficient acceleration of the motor is not obtained due to the current limitation, and where the deviation between the velocity represented by the instruction velocity signal $V_{rv}$ and the motor velocity $V_s$ is large, the deviation limiting means 21 of the invention limits the deviation limiting means output value $\theta_g$ according to a predetermined condition and controls this value so that the value represented by the velocity deviation signal $V_e$ designating the difference between the value represented by the velocity instruction operation signal $V_r$ outputted from the position control means 5 and the actual motor velocity Vs is neither equal to nor larger than a predetermined value. Consequently, the operation can quickly be transited to the position correction to be performed since a moment at which the current limiting is canceled after the output torque characteristic of the motor is recovered. Thus, the present embodiment can solve the problem that velocity control and position control, which are performed since a moment in the vicinity of a time at which the current limitation is canceled, are delayed. Consequently, the present embodiment has an advantage in that overshoots related to the velocity and the position can be suppressed.

Therefore, according to the first embodiment of this invention, there is provided a motor control apparatus adapted to control a motor by using a position loop and a velocity loop according to a position signal, which represents information on a rotational position of the motor driving an object to be controlled, and according to a position deviation signal, which represents a difference between the position signal and a position instruction signal designating a rotational position of the motor. The motor control apparatus includes a current limiting means adapted to limit an output current to the motor and also adapted to output, when the output current is limited, a current limiting signal, a deviation limiting means adapted to obtain, when the current limiting signal is outputted and when a velocity control operation is performed, an input/output deviation of the position deviation signal and also adapted to output a signal representing the obtained the input/output deviation, and an integrating means adapted to integrate this input/output deviation. When each of a velocity instruction signal and an acceleration/deceleration instruction signal is detected from the position instruction signal, an integral value of the input/output deviation signal is subtracted from the position deviation signal. Thus, this motor control apparatus can solve the problem that velocity control and position control, which are performed since a moment in the vicinity of a time at which the current limitation is canceled, are delayed. Consequently, overshoots related to the velocity and the position can be suppressed. Further, a modification of this motor control apparatus is adapted so that in a case where an output of the deviation limiting means increases even when an integral value of the input/output deviation signal is subtracted from a value represented by the position deviation signal during acceleration information represents a positive value, the output of the deviation limiting means is not increased, and that in a case where an output of the deviation limiting means decreases even when an integral value of the input/output deviation signal is subtracted from a value represented by the position deviation signal during acceleration information represents a negative value, the output of the deviation limiting means is not decreased. Thus, this modification of the first embodiment can more effectively solve the problem that velocity control and position control, which are performed since a moment in the vicinity of a time at which the current limitation is canceled, are delayed. Consequently, overshoots related to the velocity and the position can be suppressed.

SECOND EMBODIMENT

Figure 4:
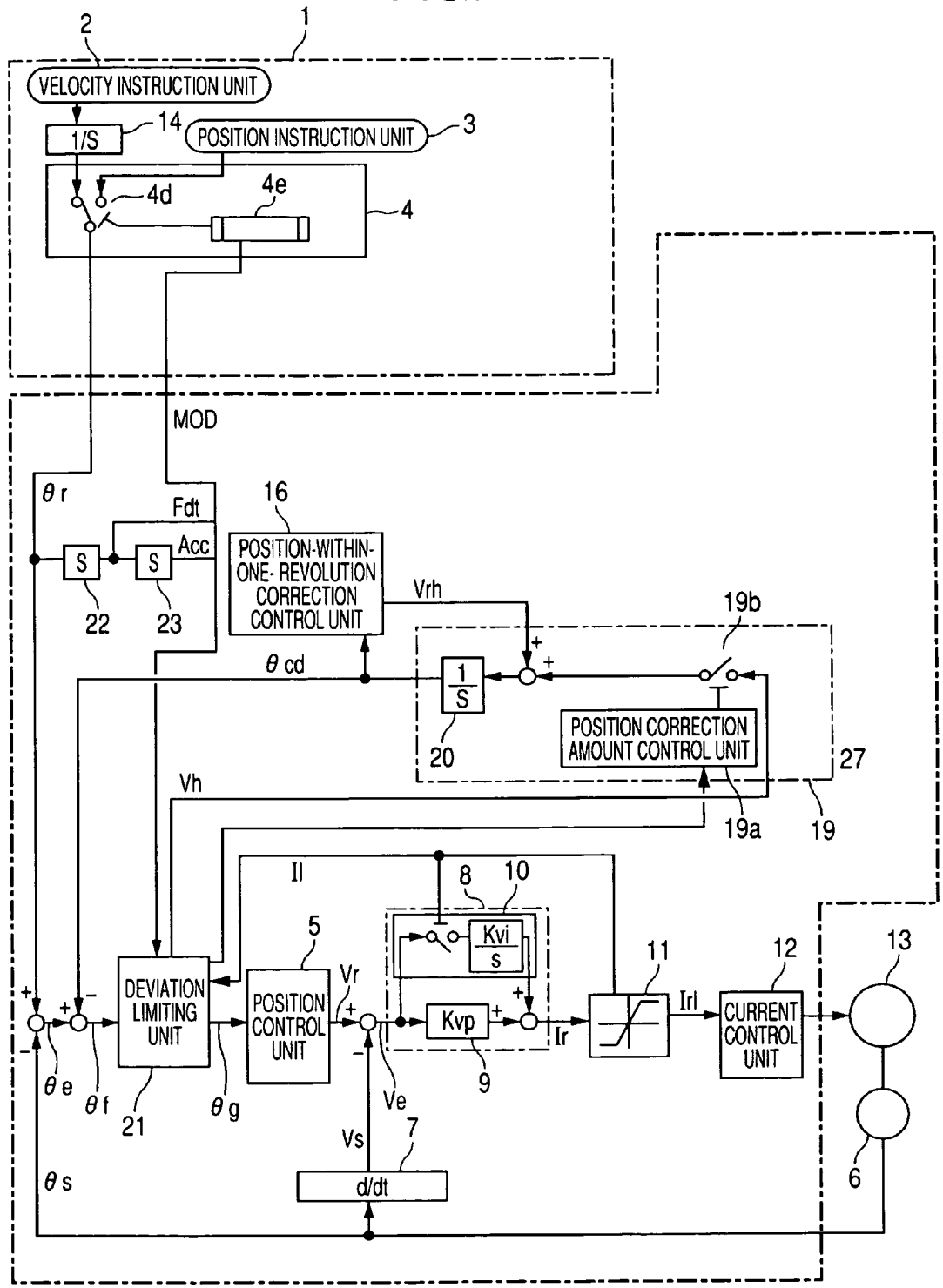
FIG. 4 is a block diagram of a motor control apparatus, which illustrates a second embodiment of the invention.

Another embodiment of the invention is described by referring to FIG. 4. FIG. 4 is a block diagram of a motor control apparatus according to a third embodiment of this invention. In FIG. 4, same reference characters designate same or corresponding parts shown in FIG. 1. The second embodiment is obtained by modifying the first embodiment so that a position represented by a position instruction coincides with the actual position of the motor. The differences in configuration between the second embodiment and the first embodiment are described below. That is, the second embodiment has a position-within-one-revolution correction control portion 16 provided at the output side of the position correcting means 19. This position-within-one-revolution correction control portion 16 normalizes the correction position deviation amount $\theta_{cd}$ outputted by a position cancellation means 19 and computes a motor position-within-one-revolution deviation signal $V_{rh}$ (that is, the control portion 16 abandons data corresponding to the number revolutions of the motor, which is equal to or more than 1, and computes a displacement amount in position within one revolution of the motor (that is, a displacement amount between a position represented by the position instruction and the actual motor position)). Then, when the control portion 16 determines that a current limitation state is canceled, and that a value represented by a current instruction is within a region of a current limit value, the position-within-one-revolution correction amount $V_{rh}$ is calculated so that the motor position-within-one-revolution deviation is 0. Subsequently, the position-within-one-revolution correction amount $V_{rh}$ is added to the integrating means 20 of the position correction means 19.

Figure 5:
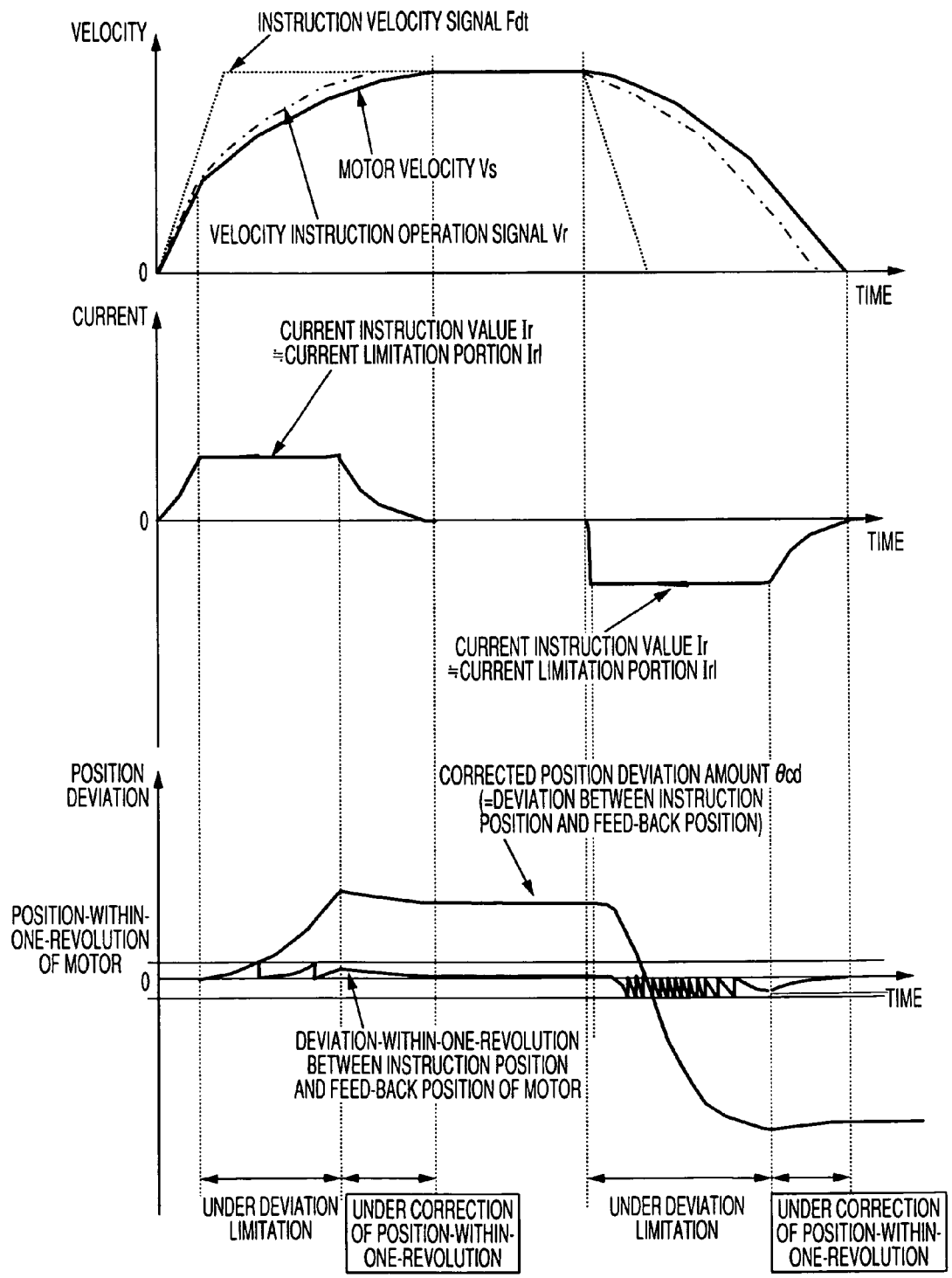
FIG. 5 is a signal waveform diagram illustrating an operation of the second embodiment of the invention.

An operation of the second embodiment is described below. FIG. 5 is a signal waveform diagram illustrating an operation of the second embodiment of the invention. The conditions of charts are the same as those of the charts of FIG. 3.

When the deviation limiting means 21 sets a value represented by the input/output deviation signal $V_h$ at 0, a motor position-within-one-revolution correction is performed. The position-within-one-revolution corresponding to the correction position deviation amount $\theta_{cd}$ (that is, a position-within-one-revolution deviation corresponding to the deviation between a position represented by the instruction position and a fed-back position) is controlled to become 0.

Therefore, the second embodiment has an advantage in that the correction of a position-within-one-revolution can be performed, in addition to the advantages of the first embodiment.

THIRD EMBODIMENT

This embodiment is obtained by adapting the second embodiment so that when correction is performed so that an actual motor-position-within-one-revolution coincides with a position designated by the position instruction, a correction amount is increased at acceleration and a correction amount is decreased at deceleration so that the correction can quickly be performed. The components of the third embodiment are the same as those of the second embodiment.

Figure 6:
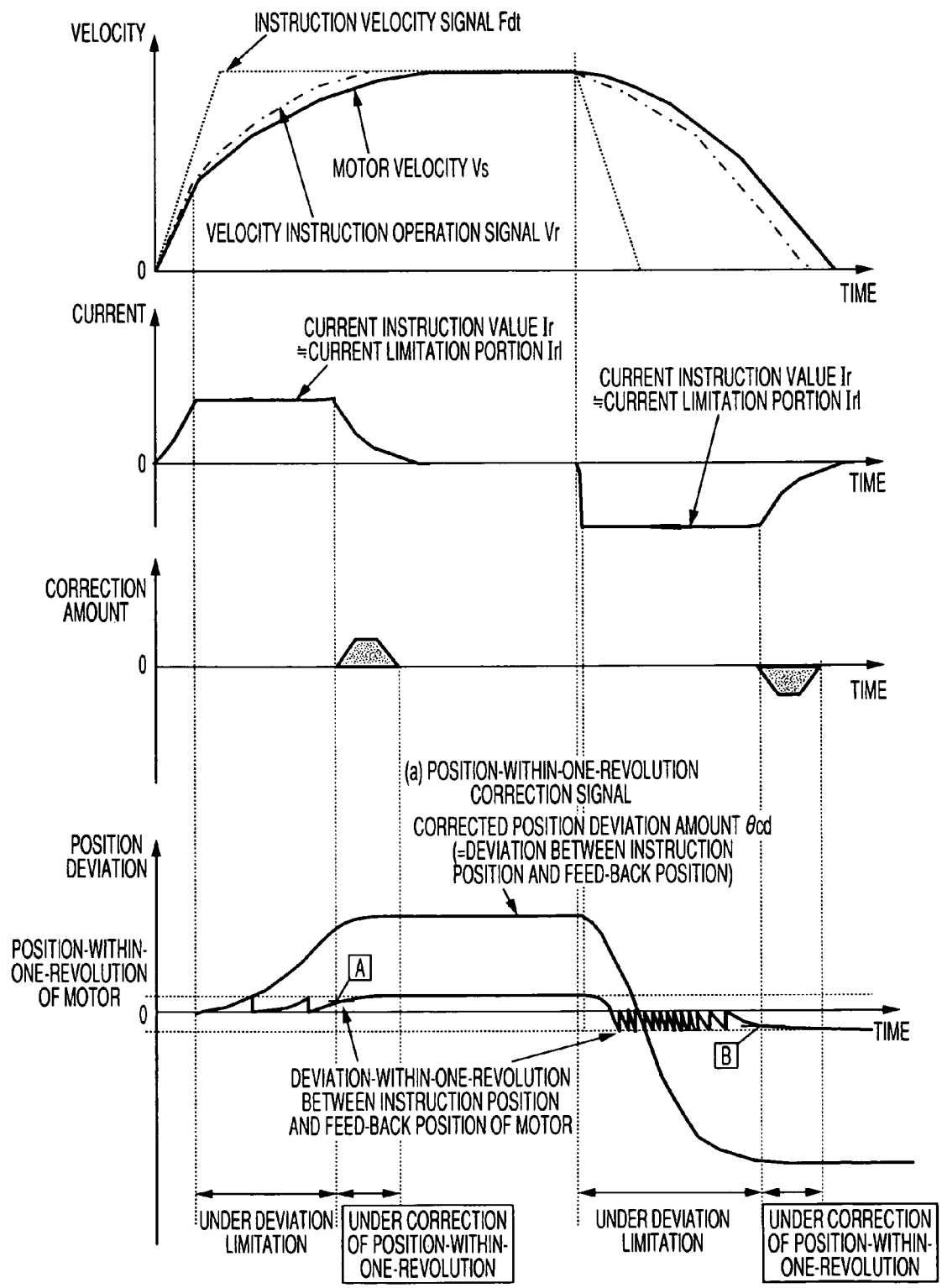
FIG. 6 is a signal waveform diagram illustrating an operation of a third embodiment of the invention.

An operation of the third embodiment is described below. FIG. 6 is a signal waveform diagram illustrating an operation of the third embodiment of the invention and illustrates a correction amount computation process. In FIG. 6, a first chart, a second chart, and a fourth chart from the top of FIG. 6 correspond to the chart shown at the top part of each of FIGS. 3 and 5, the chart shown at the middle part of each of FIGS. 3 and 5, and the chart shown at the bottom part of each of FIGS. 3 and 5, respectively. A third chart (a) from the top of FIG. 6 shows the position-within-one-revolution correction signal $V_{rh}$. The abscissas represent time, while the ordinates represent a correction amount. The position-within-one-revolution correction control portion 16 (see FIG. 4) normalizes the correction position deviation amount $\theta_{cd}$ and computes a value to be represented by the motor position-within-one-revolution deviation signal $V_{rh}$, after the current limitation state is canceled and the switch 39 in the position correction means 19 is opened, so that the level of the signal becomes 0. Then, a correction amount is set so that the value to be represented by the motor position-within-one-revolution deviation signal $V_{rh}$ corresponding to the corrected correction position deviation amount $\theta_{cd}$ is 0. Subsequently, at acceleration, a velocity waveform having a certain acceleration/deceleration pattern shown in the third chart (a) in FIG. 6 is formed so that actual position feedback is delayed behind a position instruction. A signal representing the position-within-one-revolution correction amount $V_{rh}$ is added to the input side of the integrating means 20 of the position correction means 19. Conversely, at deceleration, a velocity waveform having a certain acceleration/deceleration pattern shown in the third chart (a) in FIG. 6 is formed so that actual position feedback is advanced from a position instruction. A signal representing the position-within-one-revolution correction amount $V_{rh}$ is added to the input side of the integrating means 20 of the position correction means 19. A total correction amount determined by using the velocity waveform having a constant acceleration/deceleration pattern is set by reducing the correction position deviation amount $\theta_{cd}$ at acceleration and by increasing the correction position deviation amount $\theta_{cd}$ at deceleration to set at the value of a distance from a position-within-one-revolution of 0 so that the corrected position-within-one-revolution is 0. Thus, the correction amount is determined by the certain acceleration/deceleration pattern. Consequently, the third embodiment can quickly determine the correction amount and also can quickly perform the correction of the position-within-one-revolution.

Therefore, according to the third embodiment of the invention, the correction of the position-within-one-revolution can quickly be achieved, as compared with the second embodiment.

FOURTH EMBODIMENT

This embodiment is obtained by adapting the third embodiment so that when the correction is performed to make the actual motor position-within-one-revolution coincide with the position designated by the position, a correction pattern used to correct a position-within-one-revolution correction signal is changed according to a feedback velocity to quickly perform the correction. The components of the fourth embodiment are the same as those of the second embodiment and the third embodiment.

Figure 7:
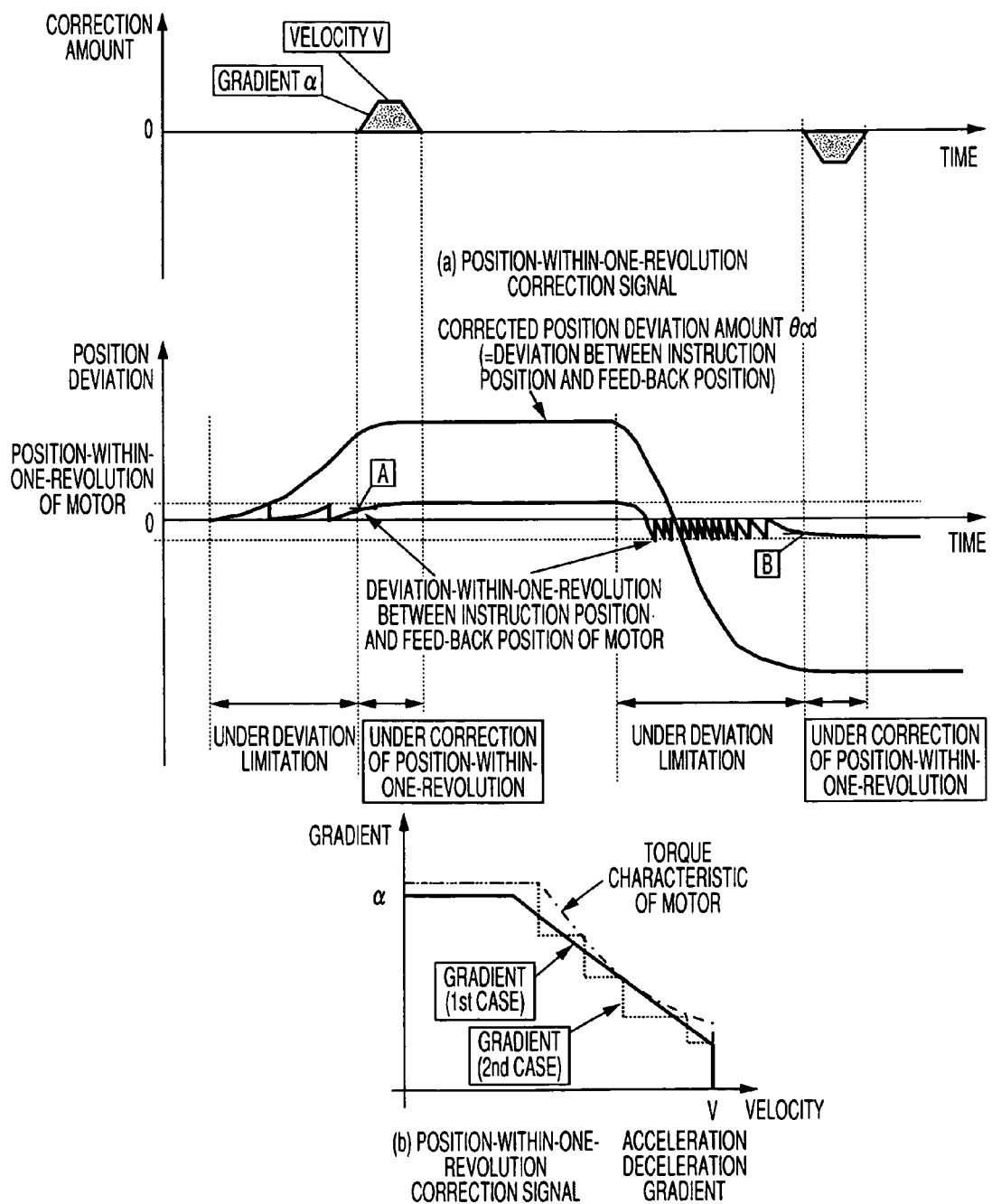
FIG. 7 is a signal waveform diagram illustrating an operation of a fourth embodiment of the invention.

An operation of the fourth embodiment is described below. FIG. 7 is a signal waveform diagram illustrating an operation of the fourth embodiment of the invention and illustrates a correction amount computation process. A chart (a) shown at a top part of FIG. 7 is the same as the third chart shown in FIG. 6, which illustrates the position-within-one-revolution correction signal $V_{rh}$. A chart shown at a middle part of FIG. 7 is the same as the fourth chart shown in FIG. 6. A graph (b) shown at a bottom part of FIG. 7 illustrates acceleration and the deceleration gradients in the position-within-one-revolution correction signal $V_{rh}$. The abscissas represent the velocity, while the ordinates represent the gradient (the acceleration). A solid line shows a first case. A chain line shows a second case. A dot-and-dash line shows a torque characteristic of the motor.

As shown in the chart (a) at the top part of FIG. 7, a maximum velocity in a correction pattern of the position-within-one-revolution correction signal $V_{rh}$ is determined at a certain rate ($\gamma$) (for example, 10%) with respect to a velocity feedback value at an actual correction starting moment. Further, the gradient (the acceleration), at which the velocity increases until reaches a maximum velocity, in the correction pattern used to correct the position-within-one-revolution correction signal is determined according to the output torque characteristic of the motor, as indicated by the dot-and-dash line shown in the bottom part (b) of FIG. 7. A continuous output torque characteristic can be selected by taking a certain margin into account as illustrated in the first case (indicated by the solid line) shown in the graph (b) at the bottom part of FIG. 7 in a case where margins of processing-time and memory-capacity are provided in the control apparatus. However, in a case where no margins of processing-time and memory-capacity are provided in the control apparatus, a stepwise characteristic can be determined just like the second case (indicated by the chain line). Consequently, the position-within-one-revolution correction to be performed since a moment, at which the current limitation is canceled, can stably and quickly be achieved.

Therefore, the fourth embodiment of this invention can stably and quickly perform the position-within-one-revolution correction, as compared with the second embodiment.

FIFTH EMBODIMENT

Figure 8:
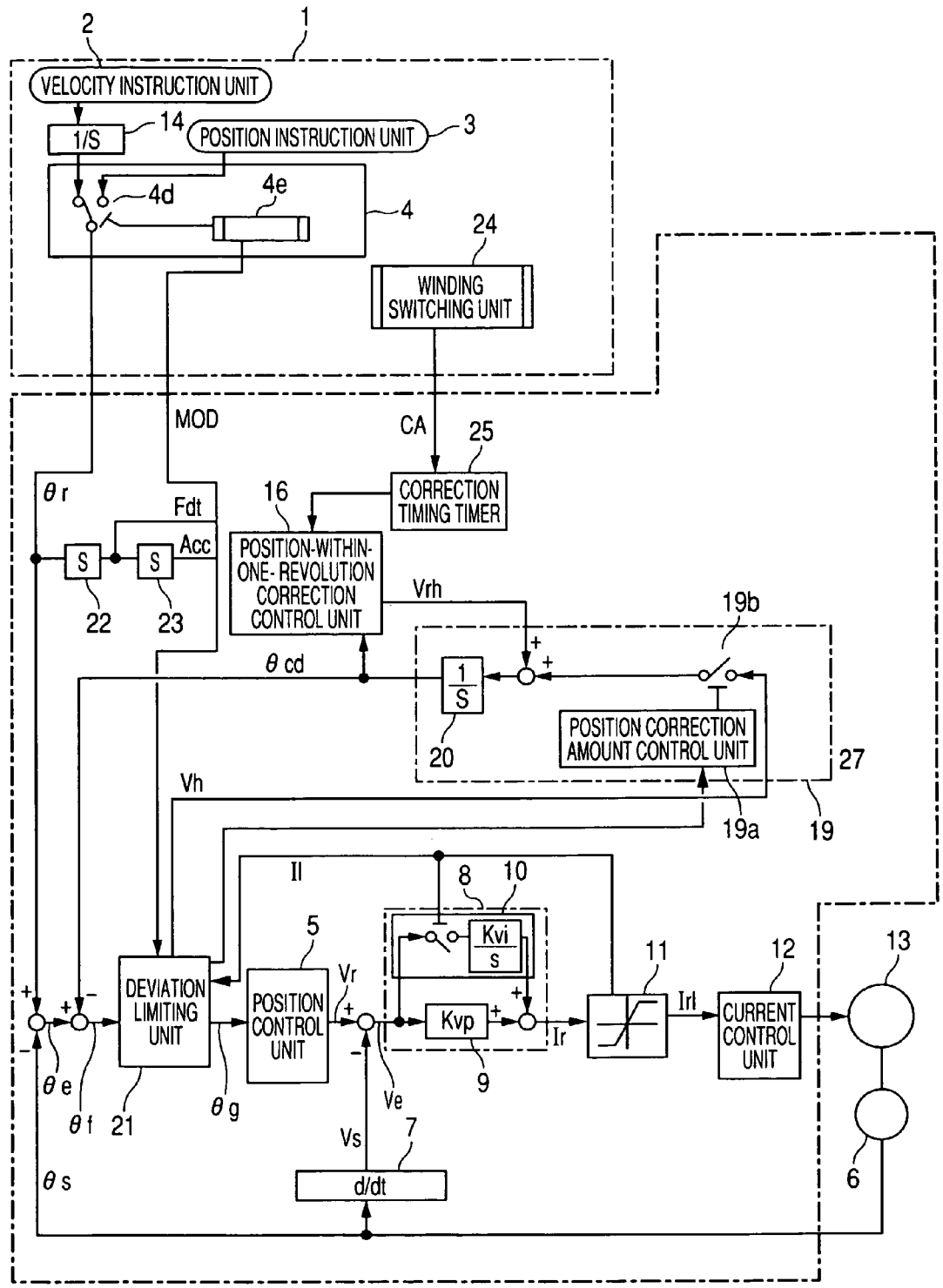
FIG. 8 is a block diagram of a motor control apparatus, which illustrates a fifth embodiment of the invention.

FIG. 8 is a block diagram of a motor control apparatus according to another embodiment of this invention. In FIG. 8, same reference characters designate same or corresponding parts shown in FIG. 1. The fifth embodiment deals with a case, in which the spindle motor is an induction motor intended to obtain desired characteristics at a high velocity and at a low velocity, by switching between windings. The fifth embodiment is described below.

Figure 9:
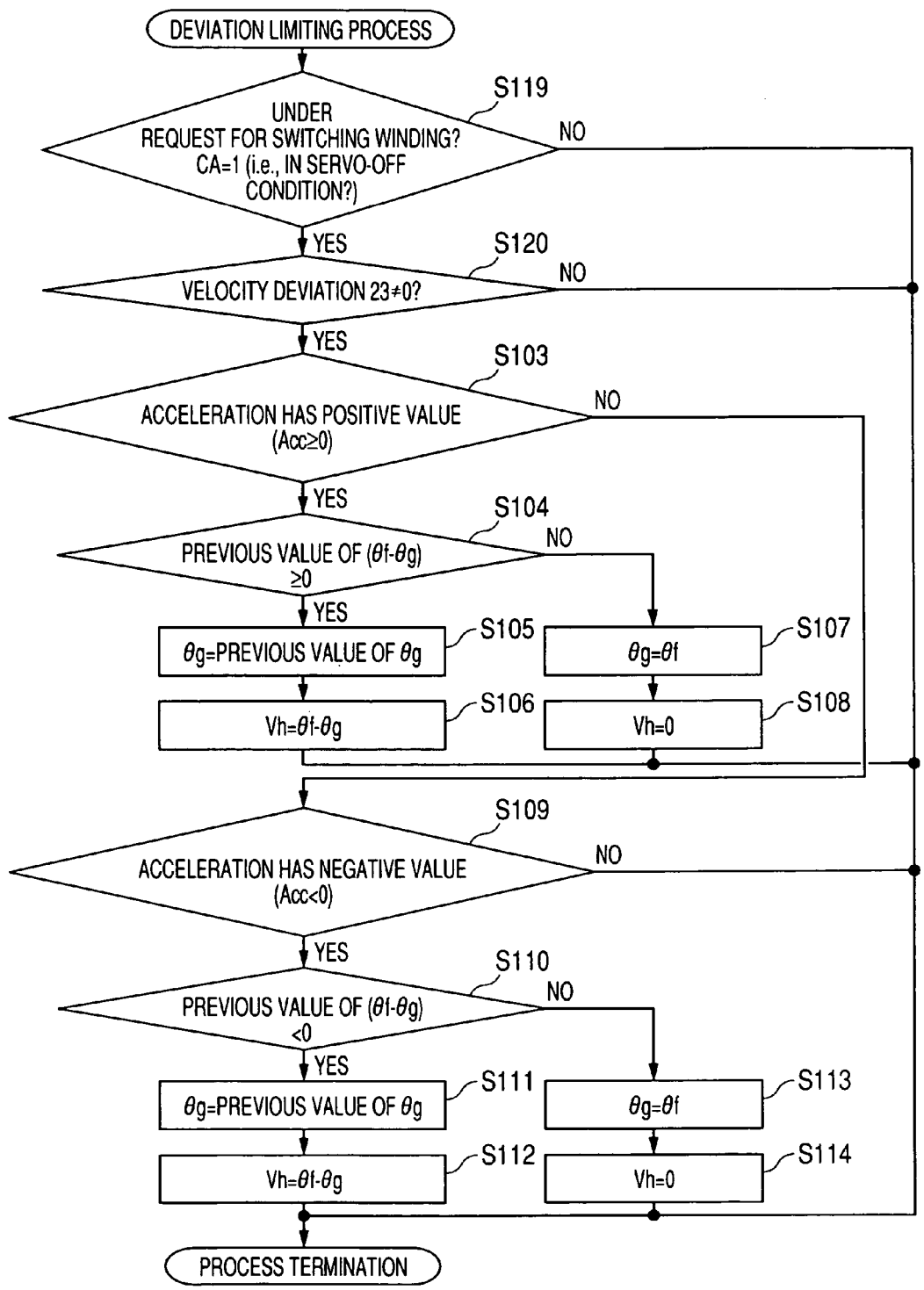
FIG. 9 is a flowchart illustrating a process performed by a deviation limitation means in the fifth embodiment of the invention.

A winding switching means 24 in an instruction generating means 1 is adapted to output, when switching between the winding of the motor, a winding switching request command CA. A correction timing timer 25 is a timer adapted to receive this winding switching request command CA and also adapted to arrange timing with which the motor position-within-one-revolution correction is performed upon completion of switching between the windings. Incidentally, the command CA is transmitted also to the deviation limiting means 21. FIG. 9 illustrates a process to be performed by the deviation limiting means 21 when receiving this winding switching request command CA. When receiving the winding switching request command CA, the motor control apparatus turns a servo off and shuts off electric current to be supplied to the motor. In this state, the deviation limiting means 21 limits a deviation limiting means output value $\theta_g$ so that the level of the velocity deviation signal $V_e$ is 0. A practical example of the position deviation limitation is similar to a processing operation performed during the current limitation (in step S101) in the velocity operation mode (in step S102) designated by the position/velocity operation switching command (MOD)50. Discrimination conditions for causing the apparatus to perform an operation are changed from those shown in steps S101 and S102 in FIG. 2 to the condition that the level of the velocity deviation signal $V_e$ is not 0 under the winding switching request, as shown in steps S119 and S120. In a case where this condition shown in steps S119 and S120 is employed, the deviation limiting means 21 limits increase in the deviation limiting means output value $\theta_g$ and controls the level of the velocity deviation signal $V_e$ to become 0, and consequently controls the level of the current instruction value $I_r$ to become 0.

Incidentally, in this time period, the switch 19b is on, so that the correction position deviation amount $\theta_{cd}$ is computed to thereby perform the deviation limiting process. Further, in a case where the winding switching is completed, and where the servo is turned on again, the position-within-one-revolution correction is started so that the motor position-within-one-revolution deviation corresponding to the correction position deviation amount $\theta_{cd}$ is 0. However, there is possibility that just after the start of the correction, the current limitation may be caused again to start the processing to be performed at the deviation limitation again. Thus, the correction timing timer 25 arranges the timing with which the position-within-one-revolution correction is performed. Consequently, even when receiving a motor winding switching request command, so that the servo is temporarily turned off and that the switching process is performed, a stable operation can be performed.

Therefore, in addition to the advantages of the second embodiment, the fifth embodiment of the invention has an advantage in that a stable operation can be performed even when a motor winding switching request command is received, so that the servo is temporarily turned off and that the switching process is performed.

SIXTH EMBODIMENT

Figure 10:
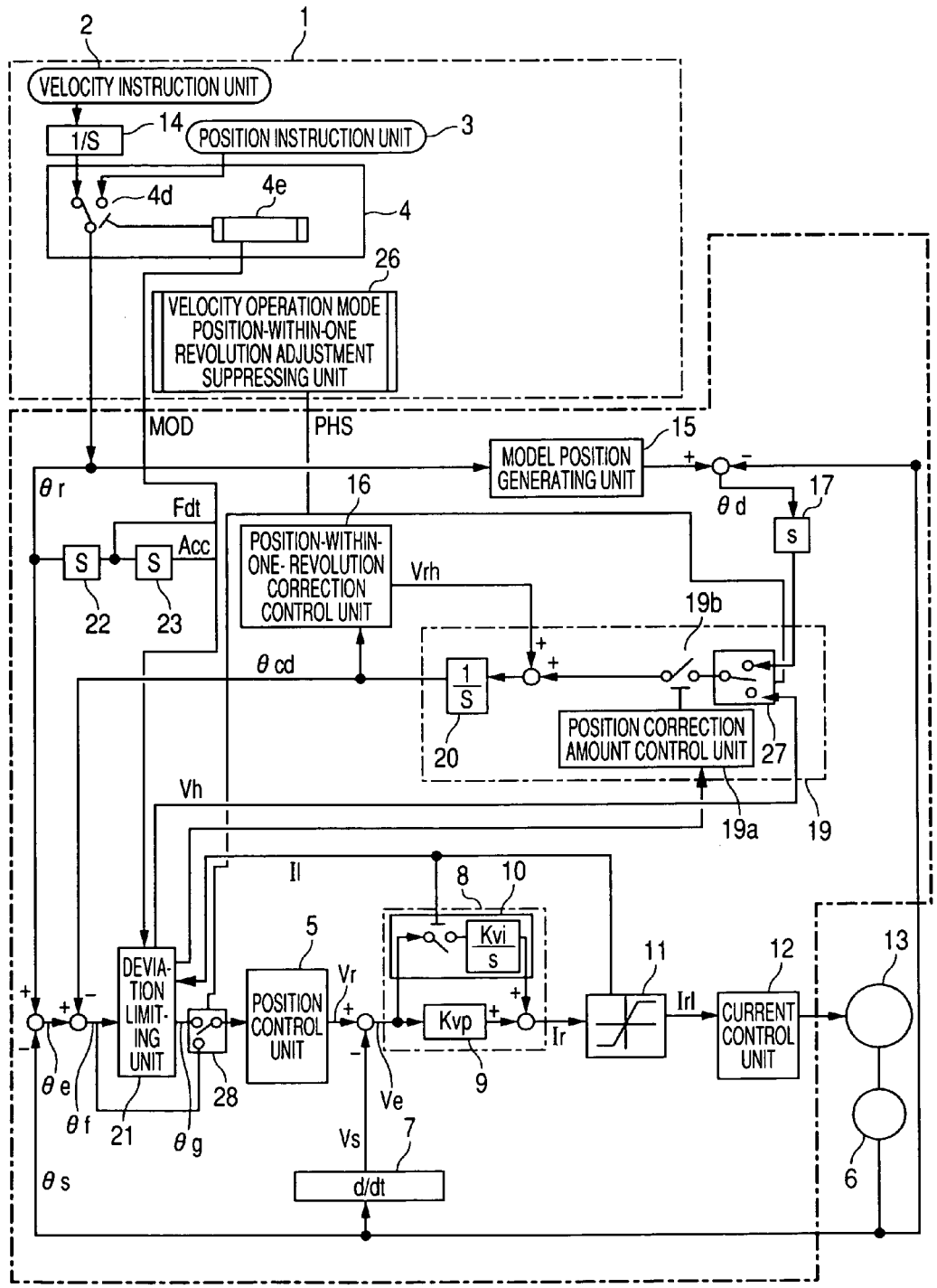
FIG. 10 is a block diagram of a motor control apparatus, which illustrates a sixth embodiment of the invention.

FIG. 10 is a block diagram of a motor control apparatus according to another embodiment of this invention. In FIG. 10, same reference characters designate same or corresponding parts shown in FIG. 4. Hereinafter, the differences between the sixth embodiment and the second embodiment shown in FIG. 4 are described. Referring to FIG. 10, in a velocity operation mode (a mode in which absolute position followingness is not requested), a command PHS, which indicates that the motor position-within-one-revolution correction is also unnecessary, is inputted to the motor control apparatus from a position-within-one-revolution adjustment suppressing means 26. The command PHS is transmitted to a switch 27 in the position correction means 19 and to a switch 28 between the deviation limiting means 21 and the position control means 5. Usually, the switch 27 is connected to an input/output deviation signal $V_h$ outputted from the deviation limiting means 21. However, when the command PHS is inputted, the switch 27 is changed over and is connected to a side opposite to the input/output deviation signal $V_h$. The side opposite thereto is connected to a signal representing a derivative value of the deviation between an ideal position of the motor 13, which is calculated by the model position generating means 15 according to a position instruction signal $\theta_r$ from an equivalent position control system model including a characteristic of an object to be controlled, and the actual position of the motor 13, which is measured by the position detecting means 6. Thus, in the case where the position/velocity operation switching command MOD designates the velocity operation at that time, the ideal position of the motor 13 is calculated. A signal representing the derivative value is generated according to the deviation between the ideal position and the actual position of the motor 13, which is measured by the position detecting means 6. Further, in a case where this command PHS is inputted, the switch 28 is changed over and is connected to a deviation input signal $\theta_f$ so that the deviation input signal $\theta_f$ is inputted directly to a position controller 5 without being passed through the deviation limiting means 21.

Therefore, according to the sixth embodiment of this invention, in a case where the motor position-within-one-revolution correction is not requested, an acceleration or deceleration time can be minimized according to the output torque of the motor.

SEVENTH EMBODIMENT

Figure 11:
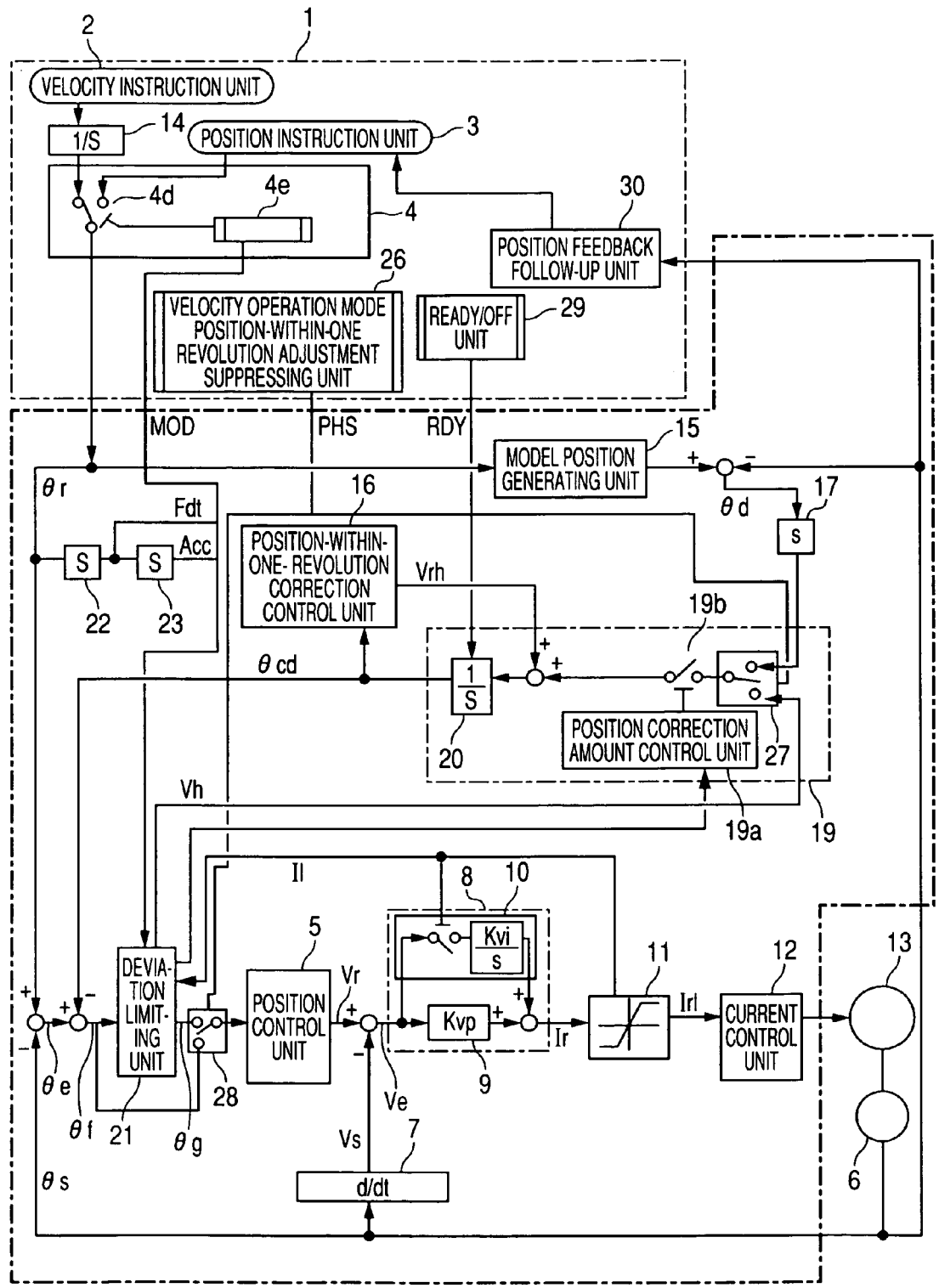
FIG. 11 is a block diagram of a motor control apparatus, which illustrates a seventh embodiment of the invention.

FIG. 11 is a block diagram of a motor control apparatus according to another embodiment of this invention. In FIG. 11, same reference characters designate same or corresponding parts shown in FIG. 10. Hereinafter, the differences between the seventh embodiment and the fifth embodiment shown in FIG. 10 are described. Referring to FIG. 11, a ready-off mode request command RDY requesting a ready-off mode, in which the control of the motor by using the motor control apparatus is unnecessary, is inputted. During the ready-off mode, the instruction generating means 1 performs a process of adjusting a value represented by the position instruction signal $\theta_r$ to the actual position of the motor, which is represented by the position signal $\theta_s$. The ready-off mode request command RDY is inputted also to the integrating means 20 in the position correction means 19. When the command RDY is inputted thereto, an integral amount in the integrating means 20 is set to be 0. That is, the correction position deviation amount $\theta_{cd}$ is set to be 0.

Therefore, according to the seventh embodiment of this invention, the control system can be suppressed from being unstabilized by an accumulated correction position deviation amount $\theta_{cd}$, which exceeds the quantity of data that can be stored in a memory or the like provided in the motor control apparatus.

Incidentally, in a case where features of the seventh embodiment, which are added to the sixth embodiment, are added to the first embodiment, advantages similar to the aforementioned advantages of the seventh embodiment can be obtained.

EIGHTH EMBODIMENT

Figure 12:
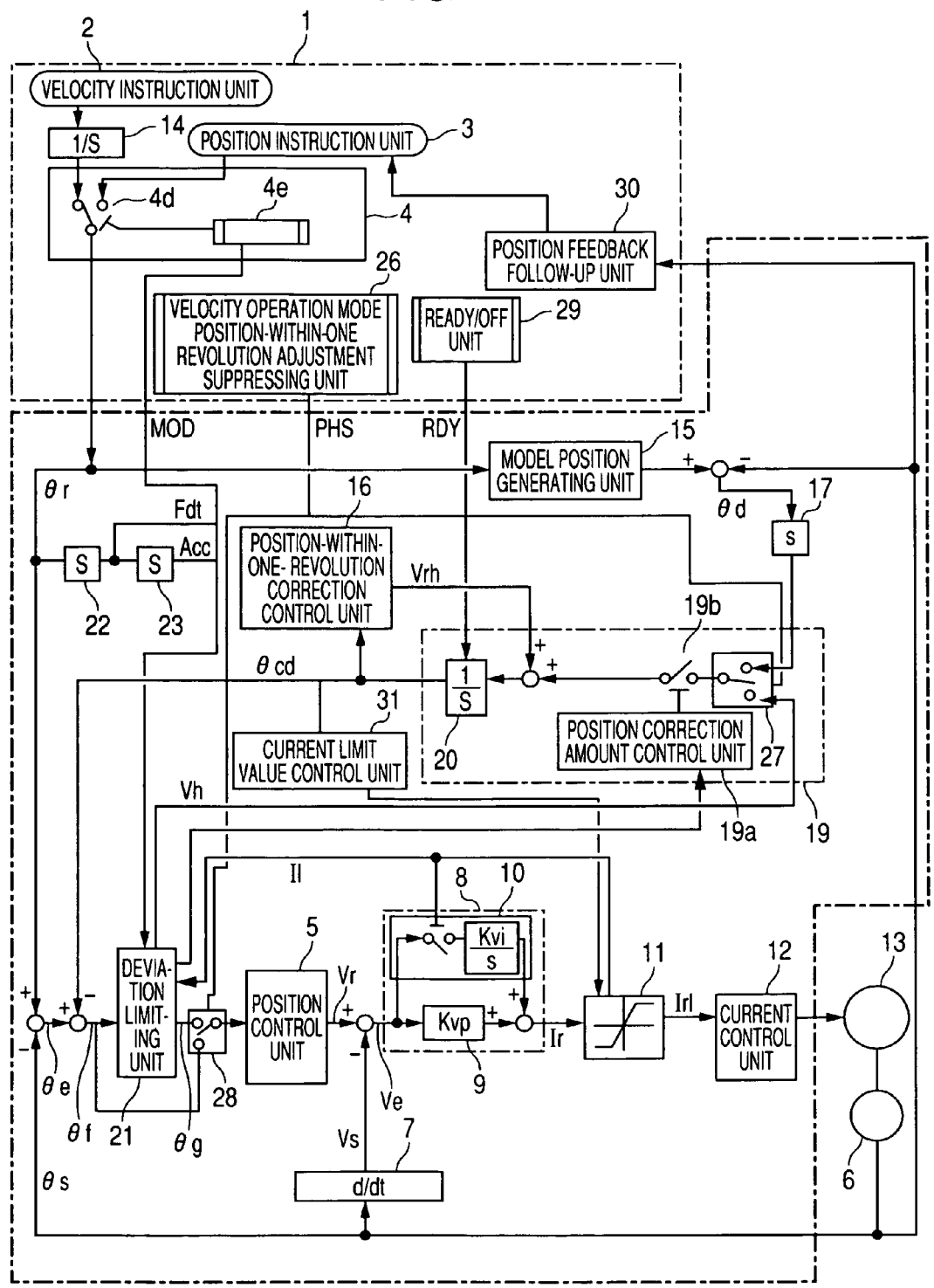
FIG. 12 is a block diagram of a motor control apparatus, which illustrates an eighth embodiment of the invention.

FIG. 12 is a block diagram of a motor control apparatus according to another embodiment of this invention. In FIG. 12, same reference characters designate same or corresponding parts shown in FIG. 11. Hereinafter, the differences between the eighth embodiment and the sixth embodiment shown in FIG. 11 are described. The eighth embodiment is obtained by modifying the sixth embodiment so that a current limit value control means 31 changes an electric current instruction value $I_{r1}$, which are outputted by the current limiting means 11 based on predetermined conditions, according to the correction position deviation amount $\theta_{cd}$.

Figure 13:
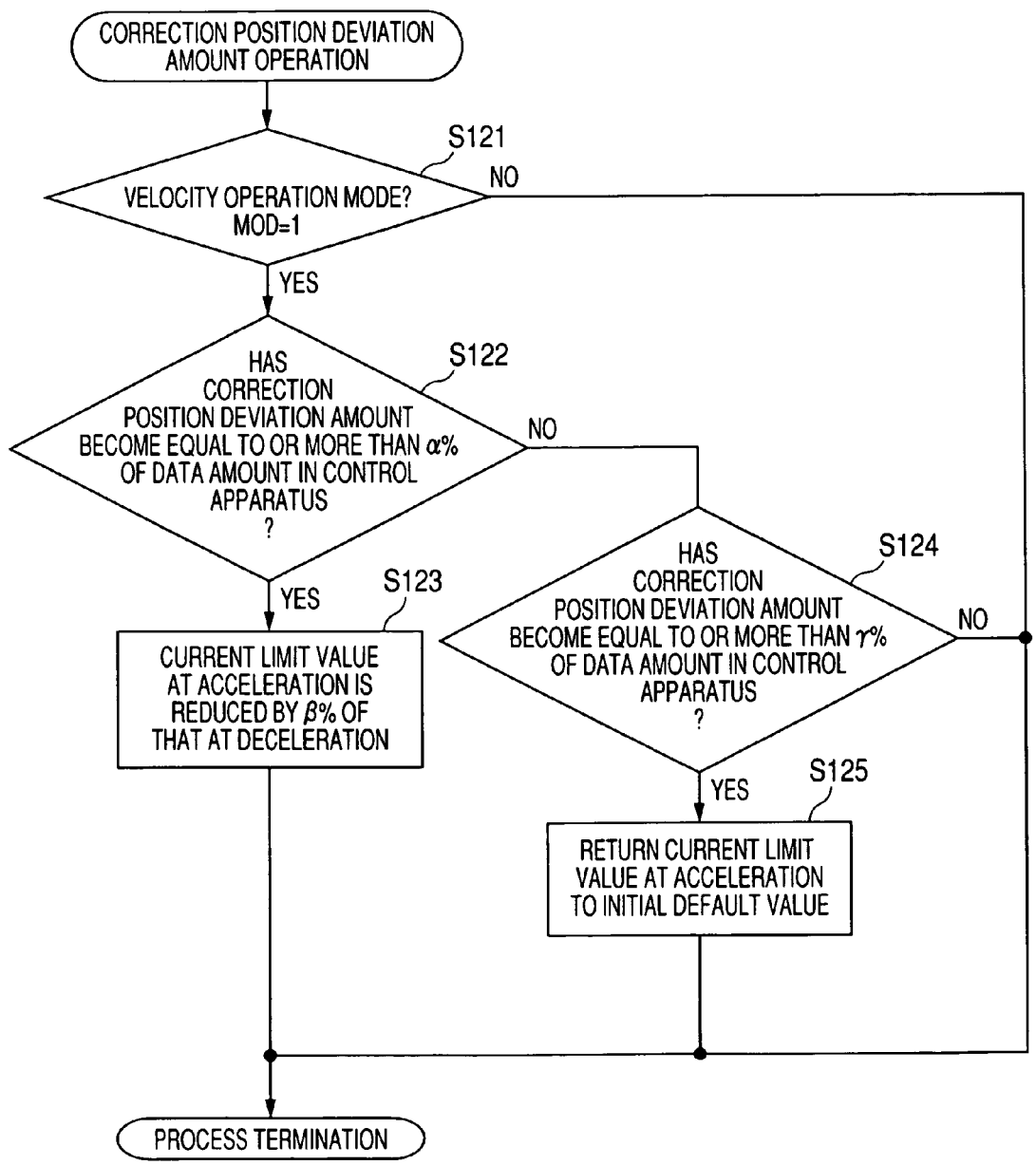
FIG. 13 is a flowchart illustrating a control process performed by a current limit control portion 31 in the eighth embodiment of the invention.
Figure 14:
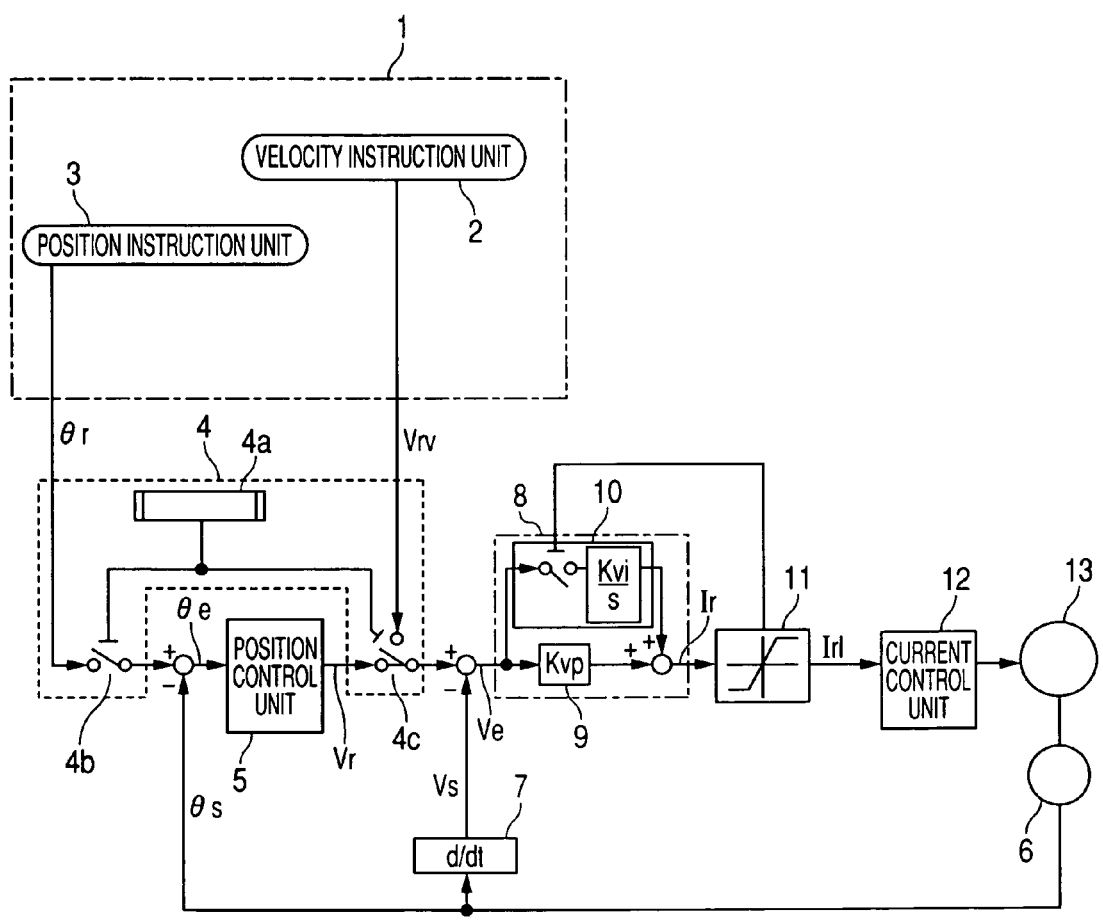
FIG. 14 is a block diagram illustrating a conventional motor control apparatus.

FIG. 13 is a flowchart illustrating a control process performed by the current limit value control means 31 in the seventh embodiment of this invention. In a case where the position/velocity operation switching command MOD designates a velocity operation mode in which the position/velocity operation switching command MOD does not request absolute position followingness (in step S121), and where a droop cancellation amount $\theta_{cd}$ is equal to or more than a predetermined value ($\alpha$ %) of the quantity of data provided in the motor control apparatus (in step S122), maximum values of the current instruction value Ir1 outputted by the current limiting means 11 are respectively set corresponding to an acceleration time and a deceleration time so that the limit value at acceleration is reduced from the maximum value at the deceleration with a certain ratio ($\beta$ %) (in step S123). Generally, at deceleration, the deviation from a value represented by the position instruction is large. The correction position deviation amount $\theta_{cd}$ is accumulated having a sign thereof at deceleration. Thus, in a case where the correction position deviation amount $\theta_{cd}$ becomes close to the quantity of data provided in the motor control apparatus in a longtime operation, an accumulated value thereof is maintained at a constant value by increasing a torque limit value at acceleration and by setting the correction position deviation amount $\theta_{cd}$ at the acceleration to be larger than the cancellation amount at deceleration. Incidentally, in a case where the correction position deviation amount $\theta_{cd}$ becomes equal to or less than a certain predetermined value ($\gamma$ %) of the quantity of data provided in the motor control apparatus once again (in step S124), the limit value of the current limiting device 11 is put back to an original predetermined value (in step S125).

Therefore, the eighth embodiment of this invention has an advantage in that the control system can be more effectively suppressed from being unstabilized by an accumulated correction position deviation amount $\theta_{cd}$, which exceeds the quantity of data that can be stored in a memory or the like provided in the motor control apparatus, as compared with the seventh embodiment.

Incidentally, in a case where features of the eighth embodiment, which are added to the seventh embodiment, are added to the first embodiment, advantages similar to the aforementioned advantages of the eighth embodiment can be obtained.

A motor control apparatus according to this invention is suitable for use in controlling a spindle motor of NC apparatus.

What is claimed is:

1. A motor control apparatus that controls a motor by using a position loop and a velocity loop according to a position signal and a position deviation signal, the position signal being information on a rotational position of the motor driving an object to be controlled, and the position deviation signal being a difference between the position signal and a position instruction signal designating a rotational position of the motor, the motor control apparatus comprising:
   a current limiting unit that limits an output current to the motor and outputs a current limiting signal, when the output current is limited;
   a deviation limiting unit that obtains an input/output deviation of the position deviation signal when the current limiting signal is outputted and a velocity control operation is performed, and outputs the input/output deviation; and
   an integrating unit that integrates the input/output deviation,
   wherein when each of a velocity instruction signal and an acceleration/deceleration instruction signal is detected from the position instruction signal, an integral value of the input/output deviation signal is subtracted from the position deviation signal.

2. The motor control apparatus according to claim 1,
   wherein in a case where an output of the deviation limiting unit increases even when the integral value of the input/output deviation signal is subtracted from the position deviation signal during acceleration information represents a positive value, the output of the deviation limiting unit is not increased; and
   in a case where the output of the deviation limiting unit decreases even when the integral value of the input/output deviation signal is subtracted from the position deviation signal during the acceleration information represents a negative value, the output of the deviation limiting unit is not decreased.

3. The motor control apparatus according to claim 1, further comprising:
   a position-within-one-revolution correction control unit that controls a position-within-one-revolution of the motor when the current limiting signal is not present.

4. The motor control apparatus according to claim 3,
   wherein the position-within-one-revolution correction control unit outputs a position-within-one-revolution correction amount as an acceleration/deceleration pattern.

5. The motor control apparatus according to claim 3,
   wherein the position-within-one-revolution correction control unit determines an acceleration and a maximum velocity of an acceleration/deceleration pattern at acceleration according to a torque characteristic of the motor, and outputs a position-within-one-revolution correction amount as the acceleration/deceleration pattern.

6. The motor control apparatus according to claim 3,
   wherein the deviation limiting unit sets, when switching between wires is performed in response to a motor winding switching request, an output value thereof at a value that causes a velocity deviation signal to become 0.

7. The motor control apparatus according to claim 3, further comprising:
   a position loop model unit that outputs an ideal position of the motor, which is determined according to the position instruction signal from an equivalent position control system including a characteristic of the object to be controlled;
   a position correction unit enabled to select a signal of a deviation between an output value of the position loop model unit and an actual position signal of the motor, and a signal of a difference between the position instruction signal and a limited output thereof; and
   a switch that inputs an input signal to be inputted to the deviation limiting unit to the position correction unit in a case where the signal of the difference between the position instruction signal and the limited output thereof is selected and where the current limiting signal is present.

8. The motor control apparatus according to claim 1,
   wherein in a case where a signal indicating that control of a motor position-within-one-revolution is unnecessary is inputted, a correction position deviation amount is set to be 0.

9. The motor control apparatus according to claim 1, further comprising:
   an electric current limit value control unit that changes a maximum value of an electric current limit value when the motor is accelerated or decelerated in a case where a correction position deviation amount is equal to or more than a predetermined value.

10. A motor control method for controlling a motor by using a position loop and a velocity loop according to a position signal and a position deviation signal, the position signal being information on a rotational position of the motor driving an object to be controlled, and the position deviation signal being a difference between the position signal and a position instruction signal designating a rotational position of the motor, the motor control method comprising:
    a step of limiting an output current to the motor and outputting a current limiting signal when the output current is limited;
    a step of obtaining an input/output deviation of the position deviation signal when the current limiting signal is outputted and a velocity control operation is performed, and outputting the input/output deviation;
    a step of integrating the input/output deviation; and
    a step of subtracting, when each of a velocity instruction signal and an acceleration/deceleration instruction signal is detected from the position instruction signal, an integral value of the input/output deviation signal from the position deviation signal.

11. The motor control method according to claim 10,
    wherein in a case where an output of the deviation limiting unit increases even when the integral value of the input/output deviation signal is subtracted from the position deviation signal during acceleration information represents a positive value, the output of the step of outputting is not increased; and
    in a case where the output of the deviation limiting unit decreases even when the integral value of the input/output deviation signal is subtracted from the position deviation signal during the acceleration information represents a negative value, the output of the step of outputting is not decreased.

* * * * *